June 5, 1956  E. L. FRANCE ET AL  2,749,189
WRAPPING WEB TREAD FOR AUTOMOTIVE VEHICLE
Filed Feb. 24, 1951  2 Sheets-Sheet 1
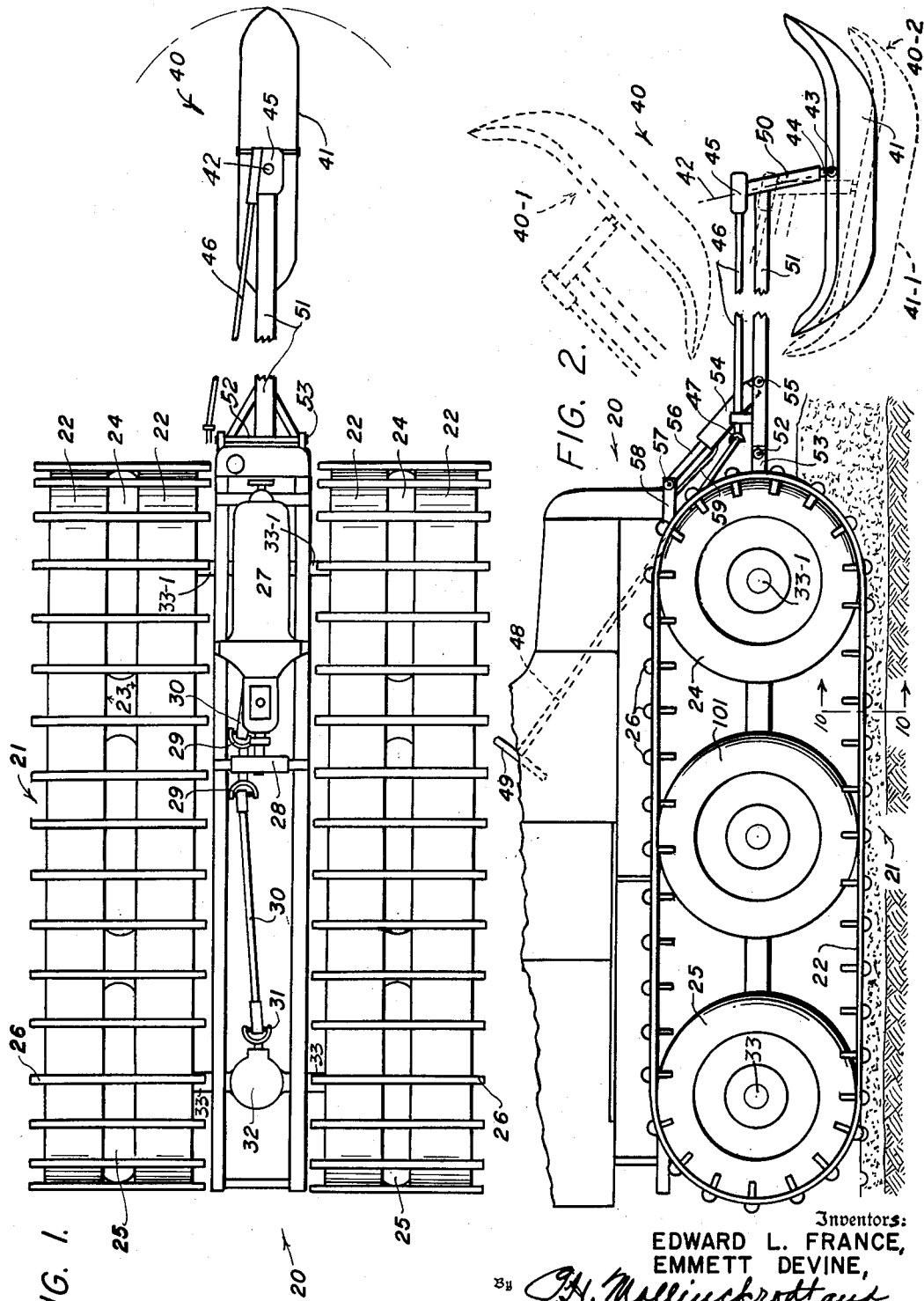
Inventors:
EDWARD L. FRANCE,
EMMETT DEVINE,
By *J.H. Mallinckrodt and Philip A. Mallinckrodt*,
Attorneys.

June 5, 1956
E. L. FRANCE ET AL
2,749,189
WRAPPING WEB TREAD FOR AUTOMOTIVE VEHICLE
Filed Feb. 24, 1951
2 Sheets-Sheet 2
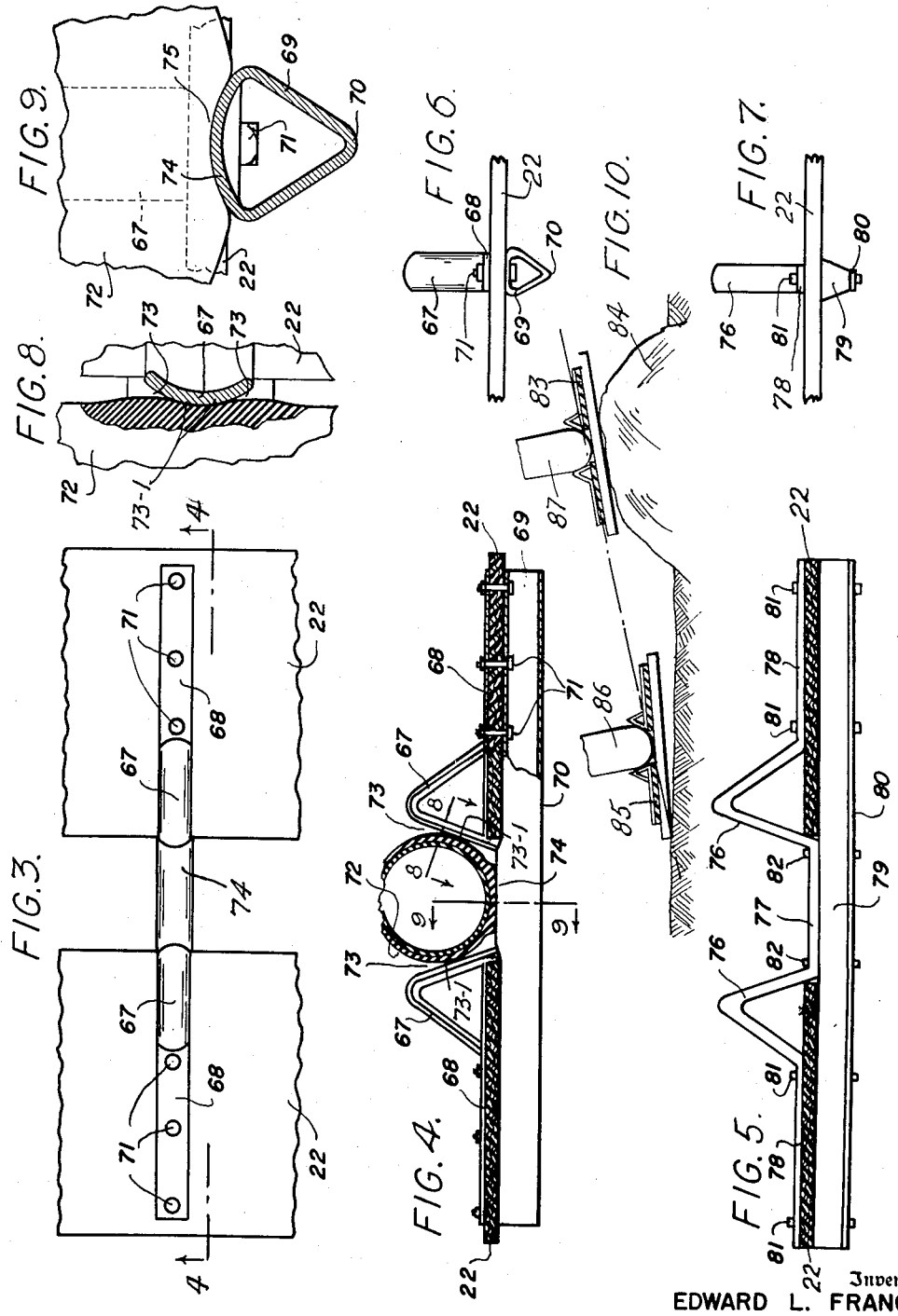
Inventors:
EDWARD L. FRANCE,
EMMETT DEVINE,
Attorneys,

United States Patent Office 2,749,189
Patented June 5, 1956

2,749,189

WRAPPING WEB TREAD FOR AUTOMOTIVE VEHICLE

Edward L. France and Emmett Devine, Logan, Utah

Application February 24, 1951, Serial No. 212,650

2 Claims. (Cl. 305—10)

This invention relates to wrapping web tread automotive vehicles especially for use in snow, mud and on ice.

Paramount objects of the invention are to provide a wrapping web tread for automotive vehicle which:

Is adapted to successfully surmount adverse road conditions;

Rides smoothly over bumps and across holes in a road surface;

Prevents road slippage;

Prevents buildup of ice, snow or mud between the tires of the vehicle wheels and the web tread;

Is substantially noiseless;

Automatically causes any web track slack to be properly distributed especially when obstructions are encountered;

Provides self-cleaning means to keep operating parts free of packed snow, ice or mud;

Other objects will become evident as the following description progresses.

Characteristic features of the invention by means of which the aforementioned objects are attained may be briefly outlined herebelow.

Ample bearing area between the web tread and road surface;

Utilization of the noiseless properties of a flexible plastic belt in contact with a pneumatic tire, instead of metal to metal contact between tread and wheel as results in customary practice;

The utilizing of spaced grousers extending transversely of the web tread so each grouser in turn is frictionally engaged by a tire;

Flexing of a tire at points of contact with a grouser to prevent incrustation of mud or ice is accomplished by reversely curving the grouser surface laterally so as to present a convex surface to the convex surface of a tire;

As a wheel revolves, an indentation is formed in the tire at its lowermost point, causing the flexure of the tire to round out the indented portion to the normal configuration of the contour, thereby fracturing any mass of ice, snow or mud that lodges or packs contiguous to the grouser.

The invention is characterized by the fact that the running gear of the vehicle is buoyant so it virtually floats on soft snow, such as freshly fallen snow, or what is known as "rotten" snow. This is brought about by inherent structural characteristics already mentioned, along with the fact that the total tread surface, or bearing area, of the vehicle on the snow, may be regarded as consisting of a plurality of, in this instance four, floats in the shape of endless ribbon elements which encircle the respective pairs of tandem traction wheels. The endless ribbons may constitute a plurality of bifurcated dualities, the members of each duality being spaced apart from each other so as to accommodate between them, a pair of tandem traction wheels. Naturally, it follows that a vehicle has at least two dualities which are spaced apart from each other in accordance with the guage of the vehicle wheels. The relative buoyancy value is determined by dividing the area of a vehicle wheel-base by the combined area of the ribbon treads located within the wheel-base.

In operation, the spacing between the two ribbons of a duality is important for the purpose of clearing away accumulated snow, ice or other debris which is loosened, largely because of the flexing action between a tire and a grouser.

In soft snow, slush and so on, the lower parts of the grousers sink in so each web tread acts to form a compressed traction terrain underneath it, which at the same time is engaged by the web tread in its tractive effort. As a consequence it is most important that the tractive efforts on both sides of the longitudinal center line of each duality be substantially equal. This prevents the vehicle from rolling over to one side or the other. Thus, the motive power from a given source of supply is divided into separate but substantially equal parts, one part being conducted directly to the front wheels and the other part being conducted directly to the rear wheels.

In the accompanying drawings which illustrate an excellent embodiment of the invention, Fig. 1 represents a plan;

Fig. 2, a side elevation;

Fig. 3, a fragmentary plan of a grouser with fragmentary portions of the web treads to which it is attached, drawn to an enlarged scale;

Fig. 4, a cross-section taken on the line 4—4 of Fig. 3;

Fig. 5, a cross-section similar to that of Fig. 4, but showing another construction;

Figs. 6 and 7, end views corresponding respectively to Figs. 4 and 5;

Fig. 8, a section on the line 8—8 in Fig. 4, drawn to a scale still further enlarged;

Fig. 9, a section taken on the line 9—9 in Fig. 4, drawn to the same scale as Fig. 8; and Fig. 10, a fragmentary vertical section taken on the line 10—10 in Fig. 2 and illustrating approximately one instance of what may happen because of the flexibility of the web tread, when an obstruction such as a rock is encountered.

Referring to the drawings, the numeral 20, Figs. 1 and 2, denotes an automotive vehicle embracing the features of the invention. Here the numeral 21 denotes the traction web tread which in this instance comprises two assemblies spaced apart longitudinally of each other, each being made up of two endless flat belts 22, spaced apart from each other as indicated at 23, so as to accommodate a front wheel 24 and a rear wheel 25, these wheels being arranged in tandem relatively to each other. The buoyancy of the running gear is measured by the quantitative relation between the combined areas of the web tread in the wheel-base and the total area of the wheel-base. In this instance Fig. 2 is drawn to scale and gives the relative buoyancy as approximately one-half. Each traction web tread 21 includes further, a plurality of tranversely spanning grousers 26 which are conveniently spaced along the endless belts 22. The constitution of the grousers will presently be described in detail.

In the present instance the vehicle is powered by means of a usual internal combustion engine 27 which is designed to drive both the front wheels 24 and the rear wheels 25 through a usual transmission 28, universal joints 29, shafts 30, universal joints 31, differential gear assemblies 32 and axle assemblies 33-1 and 33, to the respective driving wheels 24 and 25.

The vehicle is steered largely by means of a hydraulic brake system in a manner that is well known in the art. Under certain circumstances, which will be referred to later herein, auxiliary steering means is necessary. Such steering means, in the form of a ski-pilot, is exemplified at 40 in Figs. 1 and 2.

The ski-pilot consists essentially of an outboard runner 41 which oscillates about an axis 42. The runner is pivoted at 43 at the lower end of a shaft 44 which latter, at its upper end, is held in a gear assembly 45. The gear assembly is connected by suitable means, such as a shaft 46 and universal joint 47, with a steering post 48 surmounted by a steering wheel 49, very much in a conventional manner. Shaft 44 works in a housing 50 which is rigidly carried on an outrigger tongue 51. The tongue is pivoted at 52 in a fixed fork 53 so as to have limited up-and-down motion in a plane which is substantially perpendicular to the axis of pivot 52.

Thus the ski-pilot assembly 40 is subject to being moved selectively to an upper position indicated in dotted lines at 40–1; to a lower position exemplified by dotted lines at 40–2; or to any desired positions intermediate 40–1 and 40–2. To accomplish the selective movement of the ski-pilot in its motion plane, a hydraulic cylinder 54 is pivoted at 55 to the tongue 51, while a piston rod 56 working in cylinder 54 is in turn pivoted at 57 in a stationary arm 58. Hydraulic fluid, such as oil reaches cylinder 54 in this instance through a flexible conduit 59, from any suitable point of operation.

Referring now to Figs. 3 to 9, two typical grouser constructions are illustrated. In Figs. 4 and 6, the grouser consists of a bail having the two spaced peak portions 67 and the outstanding arms 68 from which depends a shoe 69. Between the bail and the shoe are recesses adapted to receive the respective belts 22 which are spaced apart from each other in the plane thereof as hereinbefore described. The shoe 69 is advantageously tubular in cross-section, so the cross-section converges and forms a penetrating longitudinal edge 70. The shoes are fastened, preferably removably by means for example, of bolts 71, which latter extend through the respective arms 68 and belts 22. Thus, the grousers are easily attached to, or detached from, the belts.

An important feature of the grouser is that an automotive tire 72 fits closely in the trough or valley formed between the two bail peaks 67 which latter are of spaced-apart, inverted V-formation as indicated in Fig. 4. The close frictional fit of the tire in the grouser bail is frequently enhanced by causing the inner faces 73 of the bail peaks, as indicated at 73–1, Figs. 4 and 8, to push slightly inward of the tire walls. For this purpose the faces 73 are convexly curved. This convex curvature is also important in preventing snow, ice or mud from caking in proximity to the tires and web treads. It is important to note that the aforementioned close fit of a tire in the valley formation does not mean that the valley follows exactly the curvature of the cross-sectional circumference. Here it means that the sides are closely tangent to such a circumference. This leaves angular recesses at the points where adjacent sides meet each other. The angular recesses allow a running tire to flex freely for clearing away clogging matter.

A further means of preventing objectionable caking is illustrated in Figs. 4 and 9 where the top 74 of the shoe between peaks 67 is convexly curved to a considerable degree. By means of this considerable curvature, every time a tire portion 75 engages a convex face 74 of a shoe, the tire is indented. As the tire moves away from the convex face 74, the resiliency of the tire causes the indented portion to spring back to the normal circular configuration of the tire, thereby fracturing or cracking off any caking which may take place between the moving parts.

In Figs. 5 and 7 is illustrated another construction of the grouser. In this construction the peaks 76 are joined by an integral portion 77 forming the bottom of the valley between the peaks 76. As before, each peak has an integral arm 78. The shoe 79 in this construction is of wood or other non-metallic material, and is clad with a metallic bottom strip 80. This grouser is fastened to the belt by means of bolts 81 and 82.

An advantageous feature of the invention is illustrated in Fig. 10 where one tandem web tread 83 of a vehicle is supposed to be going over a highly projecting rock 84, while the other web tread 85 holds its position not far from the normal. This serves to visualize the meritorious flexibility of the new web tread in combination with pneumatic tires. In Fig. 10 it is to be noted that the axially opposite tires 86 and 87 closely hold to their normal position while the flexibility of the combination allows a certain distortion in the normal positions of the respective web treads. In other words a slight warpage.

Frequently it is desirable to add one or more rubber tired wheels intermediate the front and rear drivers in the tandem arrangement thereof so as to equitably distribute the loads over the web treads. An example of such additional wheels is illustrated at 101, these intermediate wheels being rotatably mounted on stub axles.

The inventive employment of pneumatic tires in conjunction with frictionally engaging web treads results in a heretofore unattained flexibility which produces an uncommonly smooth riding result, even where unfavorable road conditions are encountered. The give-and-take properties between the pneumatic tires and the web treads, as a result of their frictional engagement with each other eliminates the often destructive shocks which are imposed by road obstructions, upon equipment of the present type where well known, positive, tooth-engaging means are employed between drivers and traveling treads.

By first removing the grousers, the web treads become quickly removable from the wheels so the vehicle is more conveniently usable on a dry, hard road surface than it would be without removal of the web treads.

In addition to the favorable features hereinbefore stressed, the normal cushioning properties of pneumatic tires, and especially balloon tires, are fully retained.

Alternating stretch and shrinkage, because of changes in temperature and/or moisture conditions, in the length of usual endless traveling tracks, which is especially objectional in chain connectors, is entirely overcome by means of the invention.

Accumulated web tread slack in the case of the invention is frequently of value where road obstructions are encountered, since a reasonable degree of such accumulated web tread slack does not impair the efficiency of the present machine.

While the foregoing description is necessarily somewhat specific, the scope of the desired patent protection is amplified in the following claims.

What is claimed is:

1. A friction drive wrapping web tread for automotive vehicles equipped with pneumatic tires and adapted for travel over low pressure bearing areas comprising a pair of flat flexible endless webs, said endless webs being laterally spaced apart to accommodate the tread of a pneumatic tire therebetween, each of said webs having a width greater than the spacing between the pair of webs, a plurality of grousers secured to the endless webs in longitudinally spaced apart relationship, each of said grousers including a single elongated ground-engaging shoe, each of said shoes being secured to the outer surface of each of the spaced apart endless webs normal to the longitudinal extension of the webs, and inwardly projecting trough-defining portions having laterally extending arms secured to the inner surface of said webs in superposed relationship to each of the shoes through which the endless webs are frictionally driven by the pneumatic tire, the trough-defining inwardly projecting portions being substantially rectilinear and of such length to frictionally engage the side wall of a pneumatic tire substantially tangentially of the curvature thereof to provide recesses at opposite sides of the tire adjacent the treads thereof and having a width substantially equal to the width of the grouser shoes and substantially less than said spacing between the pair of webs.

2. The friction drive wrapping web tread for automotive vehicles as set forth in claim 1 wherein the trough-defining side members of the inwardly projecting portions of the grousers and the shoe thereof between the endless webs are convex transversely of their tire-engaging surfaces.

References Cited in the file of this patent

UNITED STATES PATENTS

| | | |
|---|---|---|
| 541,426 | Detreux | June 18, 1895 |
| 1,118,528 | Bruce | Nov. 24, 1914 |
| 1,419,160 | McKinnon | June 13, 1922 |
| 1,560,225 | Filleul | Nov. 3, 1925 |
| 1,587,262 | White | June 1, 1926 |
| 1,821,196 | Worley | Sept. 1, 1931 |
| 2,074,389 | Grant | Mar. 23, 1937 |
| 2,150,135 | Soderstrom | Mar. 7, 1939 |
| 2,206,342 | Wiebicke | July 2, 1940 |
| 2,228,454 | Hamilton | Jan. 14, 1941 |
| 2,273,949 | Galanot | Feb. 24, 1942 |
| 2,367,751 | Bombardier | Jan. 23, 1945 |
| 2,419,522 | Acton | Apr. 29, 1947 |
| 2,426,342 | Couse | Aug. 26, 1947 |
| 2,452,671 | Merrill | Nov. 2, 1948 |
| 2,515,128 | Lammertse | July 11, 1950 |
| 2,617,659 | Grenier | Nov. 11, 1952 |

FOREIGN PATENTS

| | | |
|---|---|---|
| 542,275 | France | May 13, 1922 |
| 649,151 | Germany | Aug. 16, 1937 |
| 687,038 | Germany | Jan. 20, 1940 |
| 293,078 | Great Britain | July 4, 1928 |